United States Patent [19]

Decroix

[11] 4,404,299
[45] Sep. 13, 1983

[54] COMPOSITIONS FOR THE MANUFACTURE OF HOT-MELT ADHESIVES

[75] Inventor: Jean-Claude Decroix, Arras, France

[73] Assignee: Societe Chimique des Charbonnages-CDF CHIMIE, Paris, France

[21] Appl. No.: 368,686

[22] Filed: Apr. 15, 1982

[30] Foreign Application Priority Data

Apr. 30, 1981 [FR] France ................................ 81 08736

[51] Int. Cl.³ ............................................. C08L 91/06
[52] U.S. Cl. ....................................... 524/77; 524/68;
  524/272; 524/487; 524/488; 525/117; 526/317
[58] Field of Search ................ 524/77, 487, 488, 272, 524/68; 525/117; 526/317

[56] References Cited

U.S. PATENT DOCUMENTS

| 3,201,374 | 8/1965 | Simms | 526/317 |
| 3,869,416 | 3/1975 | Hoh | 524/272 |
| 3,896,069 | 7/1975 | Kosaka et al. | 524/68 |
| 4,081,415 | 3/1978 | Matubara et al. | 524/488 |
| 4,299,745 | 11/1981 | Godfrey | 524/488 |
| 4,316,929 | 2/1982 | McIntire et al. | 526/317 |
| 4,367,113 | 1/1983 | Karim et al. | 524/77 |

FOREIGN PATENT DOCUMENTS 1323379  5/1962  France .
8101430  8/1982  France ............................... 526/317

OTHER PUBLICATIONS

Japanese Pat. No. 54-28343 (Abstract only) to Nakayasu

Primary Examiner—John Kight, III
Assistant Examiner—M. L. Moore
Attorney, Agent, or Firm—Finnegan, Henderson, Farabow, Garrett & Dunner

[57] ABSTRACT

A composition for the manufacture of hot-melt adhesives, in which the improvement comprises a terpolymer of ethylene having a melt index between 5 and 500 dg/minute and comprising from 1 to 10 mol % of units derived from an ester selected from alkyl acrylates and methacrylates, the alkyl group having from 1 to 6 carbon atoms, and from 0.3 to 3 mol % of units derived from maleic anhydride. The composition also contains at least one tackifying resin and may contain at least one compound selected from paraffin, microcrystalline polymeric wax, and esters of a hydrogenated rosinic acid and of a lower alcohol.

11 Claims, No Drawings

COMPOSITIONS FOR THE MANUFACTURE OF HOT-MELT ADHESIVES

BACKGROUND OF THE INVENTION

The present invention relates to the field of compositions that can be used in the manufacture of hot-melt adhesives.

In general, a hot-melt adhesive is manufactured from a mixture comprising three essential components:
- a petroleum resin having a tackifying effect,
- a thermoplastic resin capable of providing the cohesion of the mixture, and
- a paraffin or a microcrystalline polymeric wax capable of adapting the viscosity of the mixture to the processing and use conditions of the adhesive.

To choose the thermoplastic resin forming part of this mixture, good properties are sought both in respect to heat stability and in respect to adhesiveness. The thermoplastic resins commonly used in compositions for the manufacture of hot-melt adhesives have been on the one hand, copolymers of ethylene and vinyl esters, in particular vinyl acetate, and, on the other hand, copolymers of ethylene and alkyl acrylates, in particular ethyl acrylate and butyl acrylate.

For example, U.S. Pat. No. 3,869,416 describes an adhesive composition comprising:
(a) 100 parts by weight of a petroleum wax reinforced by an ethylene/$C_3$–$C_{18}\alpha$-olefine copolymer, and
(b) an adhesion-promoting system consisting of a mixture of 25 to 50 parts by weight of a tackifying resin and 10 to 30 parts by weight of a polar polymeric additive. This additive is selected from:
   copolymers of ethylene and vinyl esters,
   copolymers comprising at least 85 mol % of ethylene and at least 7 mol % of alkyl (meth)acrylates, and
   copolymers comprising at least 85 mol % of ethylene and from 0.15 to 5 mol % of carboxylic acids, carboxylic acid partial esters, or carboxylic anhydrides (methacrylic acid and maleic anhydride are preferred).

The users of hot-melt adhesives are constantly seeking to improve their properties, in particular their adhesiveness on a given substrate and their ability to adhere to very diverse types of substrate. From this viewpoint, the compositions previously used are not satisfactory, irrespective of the type of substrate in question. For example, a hot-melt adhesive manufactured from a composition comprising a copolymer of ethylene and vinyl acetate has good adhesiveness on leather and on a panel made of agglomerated particles, but moderate adhesiveness on rubber, poor adhesiveness on polyvinyl chloride, aluminum, and steel, and very poor adhesiveness on glass.

SUMMARY OF THE INVENTION

The object of the present invention is therefore to provide compositions for hot-melt adhesives that simultaneously have improved properties with respect to a given substrate and good ability to adhere to very diverse types of substrate.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the improvement of the invention comprises selecting a particular thermoplastic resin comprising a terpolymer of ethylene, an ester selected from alkyl acrylates and methacrylates, and maleic anhydride. Thus, the compositions according to the invention comprise, per 100 parts by weight:
(a) from 20 to 45 parts of at least one tackifying resin,
(b) from 0 to 45 parts of at least one compound selected from paraffin, microcrystalline polymeric wax, and esters of a hydrogenated rosinic acid and of a lower alcohol, and
(c) from 20 to 70 parts comprising a terpolymer of ethylene having a melt index between 5 and 500 dg/minute and comprising:
   from 1 to 10 mol% of units derived from an ester selected from alkyl acrylates and methacrylates, said alkyl group having from 1 to 6 carbon atoms, and from 0.3 to 3 mol% of units derived from maleic anhydride.

DESCRIPTION OF THE PREFERRED EMBODIMENTS

Reference will now be made in detail to the presently preferred embodiments of the invention.

The tackifying resins that can be used in the composition according to the invention are preferably resins prepared from hydrocarbon cuts originating from naphtha steam-cracking. The resins may be mixed with an ester of a hydrogenated rosinic acid and of a higher alcohol. In particular the hydrocarbon cuts used for the preparation of the said resins may be, for example, aromatic cuts originating from petroleum or coal and containing at least one monomer selected from styrene and its derivatives, indene and its derivatives, vinyltoluenes, and allyl-benzene.

By lower alcohol according to the present invention, there is intended a mono-alcohol comprising from 1 to 4 carbon atoms. By higher alcohol according to the present invention, there is intended on the one hand mono-alcohols comprising at least 12 carbon atoms and on the other hand polyols.

Some terpolymers that can be used in the compositions according to the invention have been described in French Pat. No. 1,323,379. Particular terpolymers that can also be used, characterized namely by a polydispersity index above 6, have been described in French patent specification No. 81/1,430 in the name of the applicant. The process for the manufacture of these products consists in copolymerizing a mixture comprising 94 to 99% by weight of ethylene, 0.7 to 5% by weight of (meth) acrylic acid ester, and 0.2 to 0.9% by weight of maleic anhydride, in the presence of at least one free-radical initiator, in a reactor kept under a pressure of 1,000 to 3,000 bars and at a temperature of 170° to 280° C., in relaxing the pressure and then separating the mixture of monomer and terpolymer formed in the reactor, and finally in recycling the previously separated mixture of ethylene and monomers into the reactor, the recycled stream comprising from 99 to 99.8% of ethylene and from 0.2 to 1% of (meth)acrylic acid ester.

The compositions according to the invention may also comprise one or more mineral or organic fillers, such as carbon black, calcium carbonate, and the like.

It should be observed that, due to the particular characteristics of the terpolymers described above, and contrary to the teaching of the prior art, the presence of a compound such as a paraffin or a microcrystalline polymeric wax is not essential in the composition according to the invention.

The compositions described above possess improved properties, compared with the state of the art, and a good ability to adhere to very diverse types of substrate. These performance characteristics are further improved, however, by the addition, per 100 parts by weight of the composition, of up to 1 part of a heat-reversible modifier or crosslinking agent, such as an involatile alcohol, a mono-, di- or tri-alcoholamine. Examples of alcoholamines are ethylene glycol and benzyl alcohol. Examples of alcoholamines are monoethanolamine and diethanolamine. Pentaerythritol is an example of a polyfunctional alcohol that can be used according to the present invention.

Likewise, the performance characteristics of the compositions according to the invention may be still further improved if the component (c) of the compositions is a mixture comprising at least 40% by weight of the terpolymer and up to 60% by weight of a copolymer of ethylene and a vinyl ester such as vinyl acetate.

The preparation of the compositions according to the invention does not present any difficulty and is carried out by homogeneous mixing of the various components at a temperature between 100° and 250° C. The compatibility of the main components is good if the proportions of the compositions according to the invention and the range of temperatures indicated above are observed. In the case where a heat-reversible modified or crosslinking agent is added to the mixture, it is introduced gradually in an amount such that the viscosity of the mixture remains between about 2 and 5,000 poises if the temperature remains between 100° and 200° C. In fact, if the viscosity of the crosslinked mixture becomes too high, a gel is obtained that is difficult to handle for subsequent use.

The compositions prepared in this way are particularly useful as hot-melt adhesives, on the one hand because of their improved properties with respect to the given substrate, and on the other hand because of their ability to adhere to very diverse types of substrate. The property which best distinguishes the compositions according to the invention from the compositions according to the prior art, comprising an ethylene/vinyl acetate copolymer or an ethylene/ethyl acrylate copolymer, is the ultimate shearing strength, designated as USS below, which is determined according to the method below and expressed in kgf/5 cm$^2$.

The purpose of the following examples is to illustrate several embodiments of the present invention without implying a limitation.

EXAMPLES 1 TO 4

Manufacture of Ethylene/Ethyl Acrylate/Maleic Anhydride Terpolymers

A cylindrical autoclave reactor comprised three zones, each having a volume of 1 liter, and was equipped with a blade stirrer. The zones were separated by valve-screens. Fresh ethlene, compressed by a first compressor, fed the first zone. The second zone was fed with a homogeneous mixture of ethylene, maleic anhydride (MA), and ethyl acrylate (EA). Finally, a solution of tert-butyl 2-ethyl-perhexanoate in a hydrocarbon cut was injected into the third zone. The latter therefore constituted the only reaction zone because it brought the three comonomers into contact with a free-radical initiator. Table I below shows, on the one hand, the proportions by weight of maleic anhydride and ethyl acrylate in the reaction zone, relative to the ethylene, and, on the other hand, the temperature in the zone. The reactor was kept under a pressure of 1,600 bars. An expansion valve, which makes it possible to lower the pressure to 300 bars, was located at the bottom of the third zone of the reactor. After having passed through the expansion valve, the mixture of the molten polymer on the one hand and the gaseous monomers on the other hand passed into a separating hopper. While the polymer was collected at the bottom of the hopper, the monomers, after passage through a degreasing hopper, were led into a second compressor. Furthermore, a solution of maleic anhydride in ethyl acrylate was pumped in under pressure and led into the inlet of a Venturi-type homogenizer, where it was mixed with the stream of the recycled monomers coming from the second compressor. At the outlet of this Venturi device, the mixture of the three monomers was led into a sprial homogenizer and then transferred to the second zone of the reactor.

On leaving the separating hopper, the resulting terpolymer was analyzed by infra-red spectrophotometry and the molar proportions of ethyl acrylate units and maleic anhydride units were determined; these are indicated in Table I below. Furthermore, the melt flow index of the polymer was determined according to ASTM Standard Specification D 1238-73 and expressed in dg/minute.

EXAMPLES 5 (COMPARISON) AND 6

Adhesion of Hot-Melt Adhesive Composition to Various Substrates

A mixture was prepared that comprised, by weight, 100 parts of a thermoplastic resin, 50 parts of an aliphatic petroleum resin marketed under the reference ESCOREZ 5320, 20 parts of a colophony hydrogenated and esterified by glycerol (marketed under the reference STAYBELITE ESTER 10), and 0.4 part of an antioxidant.

In Example 5 (comparison), the thermoplastic resin was an ethylene/vinyl acetate copolymer marketed under the reference ELVAX 260, while in Example 6, the thermoplastic resin was the terpolymer of Example 4 above.

The specific adhesion of the compositions thus obtained to various substrates was then evaluated, under identical conditions, by means of a qualitative and uniform notation for the substrates in question.

The results of this evaluation are collated in Table II below.

TABLE I

| Example | T °C. | Reactor | | Polymer | | MFI |
| --- | --- | --- | --- | --- | --- | --- |
| | | % MA | % EA | % MA | % EA | |
| 1 | 180 | 0.26 | 2.6 | 0.9 | 6.5 | 200 |
| 2 | 185 | 0.52 | 5.2 | 0.9 | 8.2 | 38 |
| 3 | 175 | 0.94 | 4.4 | 2.1 | 7.7 | 50 |
| 4 | 180 | 0.30 | 3.5 | 0.9 | 6.1 | 7.1 |

TABLE II

| Substrate | Example 5 | Example 6 |
| --- | --- | --- |
| Leather | Good | Good |
| Rubber | Moderate | Good |
| Rigid polyvinyl chloride | Poor | Very good |
| Panel made of agglomerated particles | Good | Good |
| Aluminum | Poor | Good |
| Steel | Poor | Good |
| Glass | Very poor | Moderate |

EXAMPLES 7 TO 10 (COMPARISON) AND 11 TO 22

The object of the examples below is to describe the value of using, for adhesion to wood, compositions obtained from various copolymers according to the prior art (Examples 7 to 10) and from the terpolymers of Examples 1 to 3, optionally modified by the addition of a heat-reversible crosslinking agent (Examples 11 to 22).

All the compositions tested in this series of examples consist of 50 parts by weight of an aromatic petroleum resin marketed under the reference NORSOLENE M 1080, 50 parts of a paraffin having a melting poing of 53° C., and 50 parts of a thermoplastic resin.

In Examples 7 and 8, the thermoplastic resin used was a commercial ethylene/ethyl acrylate copolymer comprising, respectively, 15.7% (Example 7) and 21.3% (Example 8) by weight of acrylate. In Examples 9 and 10, the thermoplastic resin used was a commercial ethylene/vinyl acetate copolymer comprising, respectively, 28% (Example 9) and 18% (Example 10) by weight of acetate. The melt flow indices MFI of the resins used are indicated in Table III below.

In Examples 11 and 12, the thermoplastic resins used were, respectively, the terpolymers of Examples 3 and 4 above. In Examples 13 and 14, the thermoplastic resins used were, respectively, the terpolymers of Examples 1 and 2 above.

In Examples 15 to 18, the thermoplastic resin used was the terpolymer of Example 1 modified by the gradual addition, during the preparation of the composition, of a heat-reversible modifier or crosslinking agent. The nature and the amount of this modifier or crosslinking agent, measured in parts by weight, were as follows:

Example 15: 0.9 part of ethylene glycol.
Example 16: 0.5 part of diethanolamine.
Example 17: 1.5 parts of benzyl alcohol.
Example 18: 0.5 part of triethanolamine.

In Examples 19 to 21, the thermoplastic resin used was the terpolymer of Example 2, modified by the gradual addition, during the preparation of the composition, of a heat-reversible modifier or crosslinking agent. The nature and the amount of this modifier or crosslinking agent, measured in parts by weight, were as follows:

Example 19: 0.9 part of ethylene glycol.
Example 20: 1.4 parts of benzyl alcohol.
Example 21: 0.1 part of diethanolamine.

The resin used in Example 22 was a mixture of 30 parts of a commerical ethylene/vinyl acetate copolymer comprising 25% by weight of acetate, and 20 parts of the terpolymer of Example 1, modified by the addition of 0.2 part of triethanolamine as a heat-reversible crosslinking agent.

The following properties, the values of which are shown in Table III below, were measured on the compositions prepared in this way:

Ultimate shearing strength: the hot-melt composition was applied hot, with the aid of a spatula, to the central part, having a surface area of 10 cm$^2$, of a beechwood test-piece of dimensions 10×2 cm. A second wooden test-piece, of dimensions 5×2 cm, was rapidly placed on the part coated with adhesive, while exerting a pressure so as to obtain a uniform thickness of adhesive. After standing for three days, the larger test-piece is cut through the middle, with the aid of a saw, and the resistance to separation is measured with the aid of a Lhomargy tensile tester. The resistance to separation is expressed in kgf/5 cm$^2$.

Viscosity: the measurement was carried out at two temperatures with the aid of a Rheomat 30 viscometer, and the results are expressed in poises.

TABLE III

| Example | MFI | USS | Viscosity 200° C. | Viscosity 100° C. |
| --- | --- | --- | --- | --- |
| 7 | 5.6 | 57 | 21 | 306 |
| 8 | 20 | 55 | 12 | 170 |
| 9 | 25 | 85 | 12 | 155 |
| 10 | 180 | 41 | 3.5 | 45 |
| 11 | 50 | 84 | 3.7 | 21 |
| 12 | 7.1 | 126 | 16 | 248 |
| 13 | 200 | 85 | 3.3 | 30 |
| 14 | 38 | 90 | 9.5 | 93 |
| 15 | 200 | 98 | 3 | 42 |
| 16 | 200 | 146 | 14 | * |
| 17 | 200 | 90 | 3 | 34 |
| 18 | 200 | 161 | 3.8 | * |
| 19 | 38 | 101 | 8 | 159 |
| 20 | 38 | 112 | 8 | 83 |
| 21 | 38 | 131 | 15 | 150 |
| 22 | 320 | 108 | 2.7 | 48 |

*The viscosity, which was very high, could not be measured by the instrument used.

It will be apparent to those skilled in the art that various modifications and variations could be made in the composition of the invention without departing from the scope or spirit of the invention.

What is claimed is:

1. A composition comprising, per 100 parts by weight, (a) from 20 to 45 parts of at least one tackifying resin, (b) from 0 to 45 parts of at least one compound selected from paraffin, microcrystalline polymeric wax, and esters of a hydrogenated rosinic acid and of a lower alcohol, and (c) from 20 to 70 parts comprising a terpolymer of ethylene having a melt index between 5 and 500 dg/minute and comprising:

from 1 to 10 mol% of units derived from an ester selected from alkyl acrylates and methacrylates, said alkyl group having from 1 to 6 carbon atoms, and from 0.3 to 3 mol% of units derived from maleic anhydride.

2. A composition according to claim 1, wherein the tackifying resin is prepared from hydrocarbon cuts originating from the steam-cracking of naphtha.

3. A composition according to claim 1 or 2, wherein said resin is mixed with an ester of a hydrogenated rosinic acid and of a higher alcohol.

4. A composition according to claim 2, wherein the hydrocarbon cuts used for the preparation of said tackifying resin comprise at least one monomer selected from styrene and its derivatives, indene and its derivatives, vinyltoluenes, and allyl-benzene.

5. A composition according to claim 1 or 2, wherein the terpolymer has a polydispersity index above 6.

6. A composition according to claim 1, wherein the component (c) comprises a mixture comprising at least 40% by weight of said terpolymer and up to 60% by weight of a copolymer of ethylene and a vinyl ester.

7. A composition according to claim 1, 2, or 6, further comprising, per 100 parts by weight, up to 1 part of a heat-reversible modifier or crosslinking agent.

8. A composition according to claim 7, wherein said heat-reversible modifier or crosslinking agent is selected from the group consisting of involatile alcohols, mono-, di- and tri-alcoholamines, and polyfunctional alcohols.

9. A composition according to claim 1 or 2, further comprising at least one mineral or organic filler.

10. A process for the preparation of a composition according to claim 1, comprising mixing components (a), (b), and (c) homogeneously at a temperature between 100° and 250° C.

11. A process according to claim 10, further comprising introducing a heat-reversible modifier or crosslinking agent gradually into the mixture in an amount such that the viscosity of said mixture remains between about 2 and 5,000 poises if the temperature remains between 100° and 200° C.

* * * * *